Figure 1:
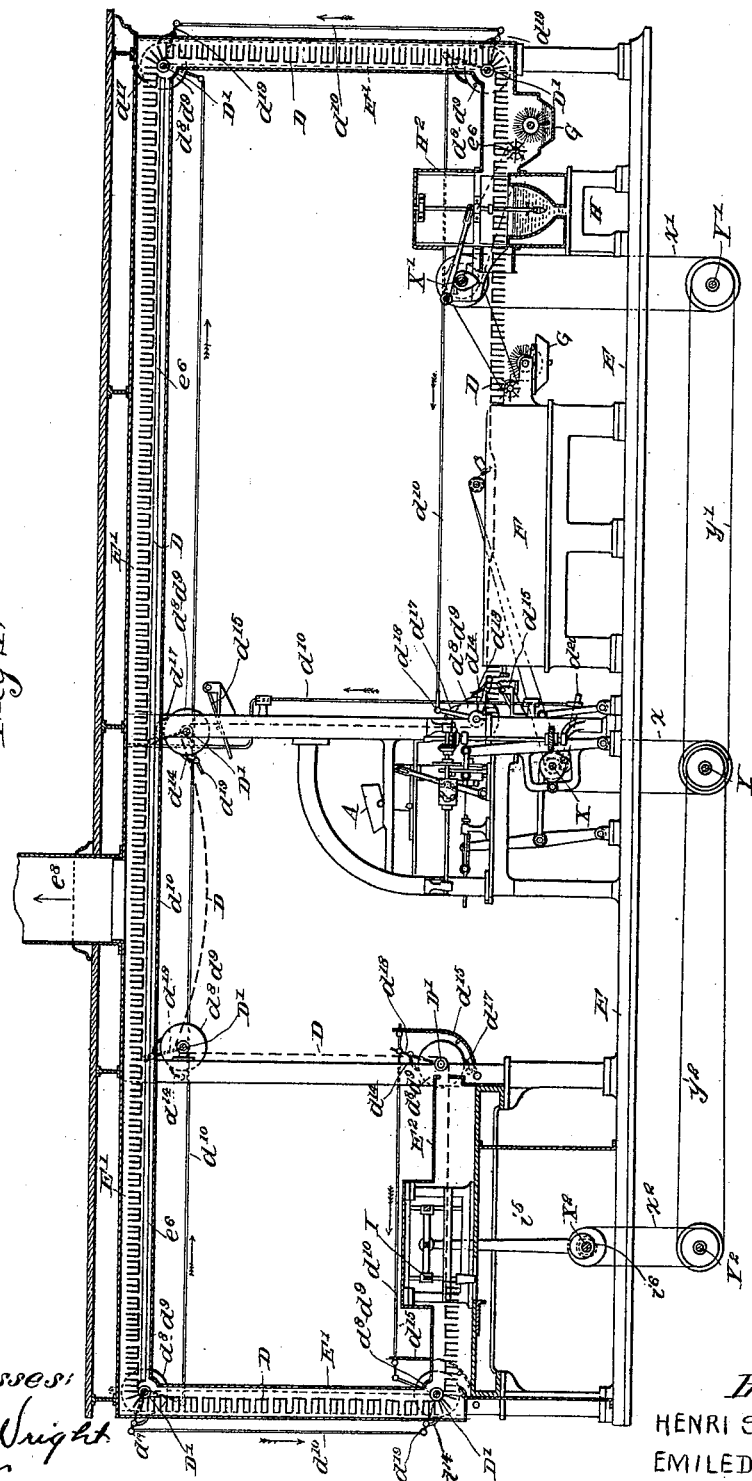

No. 643,010. Patented Feb. 6, 1900.
H. SÉVÈNE & E. D. CAHEN.
MACHINE FOR MANUFACTURING AND BOXING MATCHES.
(Application filed Aug. 21, 1897.)
(No Model.) 15 Sheets—Sheet 1.

Witnesses:
F. W. Wright
S. C. Connor

Inventors:
HENRI SÉVÈNE
EMILE D. CAHEN
BY Howson and Howson
THEIR ATTORNEYS.

No. 643,010. Patented Feb. 6, 1900.
H. SÉVÈNE & E. D. CAHEN.
MACHINE FOR MANUFACTURING AND BOXING MATCHES.
(Application filed Aug. 21, 1897.)
(No Model.) 15 Sheets—Sheet 3.

WITNESSES
S. C. Connor
M. E. Durand

INVENTORS
Henri Sévène
Emile D. Cahen
BY
Howson and Howson
THEIR ATTORNEYS

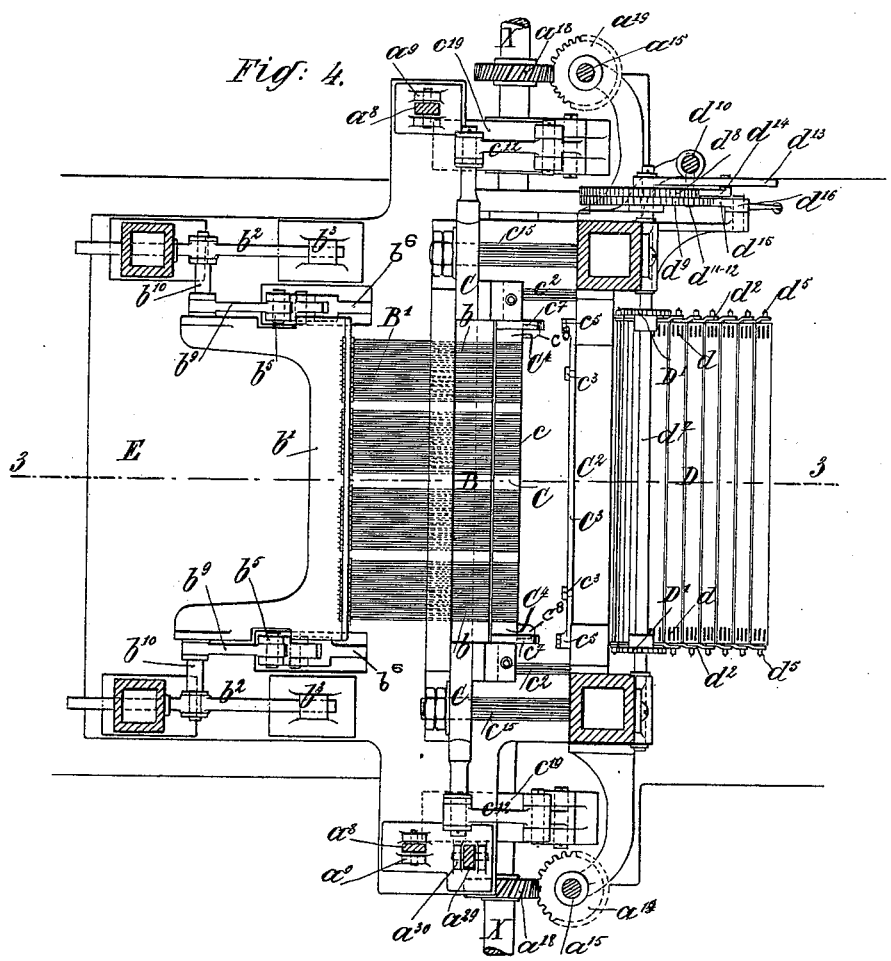

No. 643,010. Patented Feb. 6, 1900.
H. SÉVÈNE & E. D. CAHEN.
MACHINE FOR MANUFACTURING AND BOXING MATCHES.
(Application filed Aug. 21, 1897.)
(No Model.) 15 Sheets—Sheet 5.
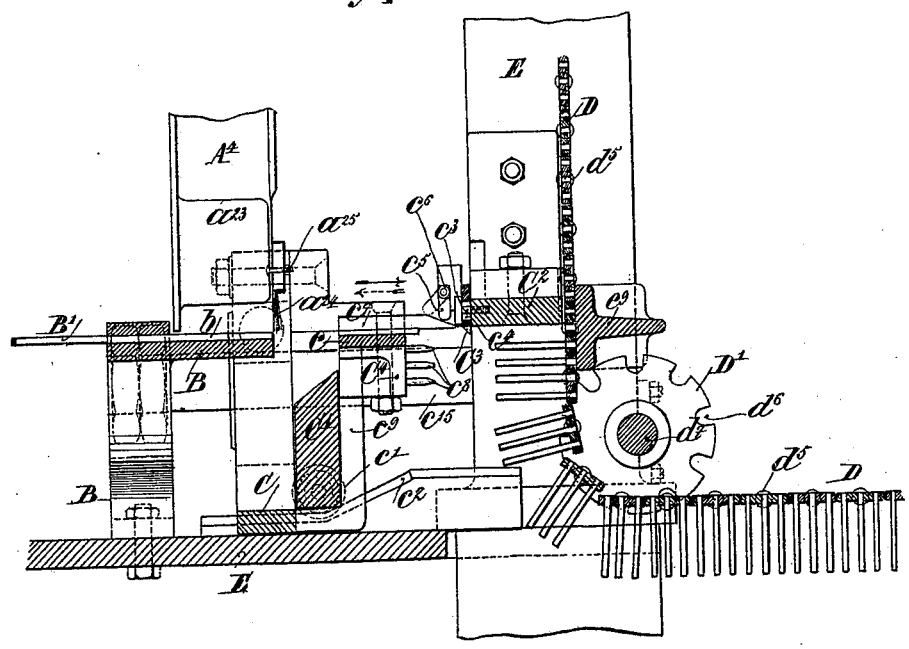
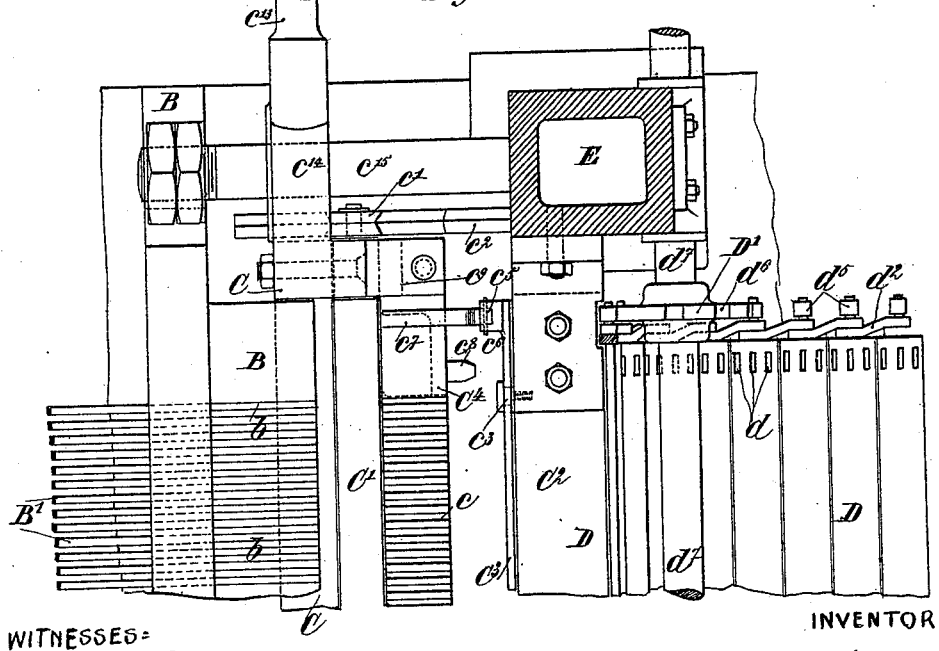
WITNESSES:
R. W. Wright
S. C. Connor
INVENTORS
HENRI SÉVÈNE
EMILE D. CAHEN
BY Howson and Howson
THEIR ATTORNEYS

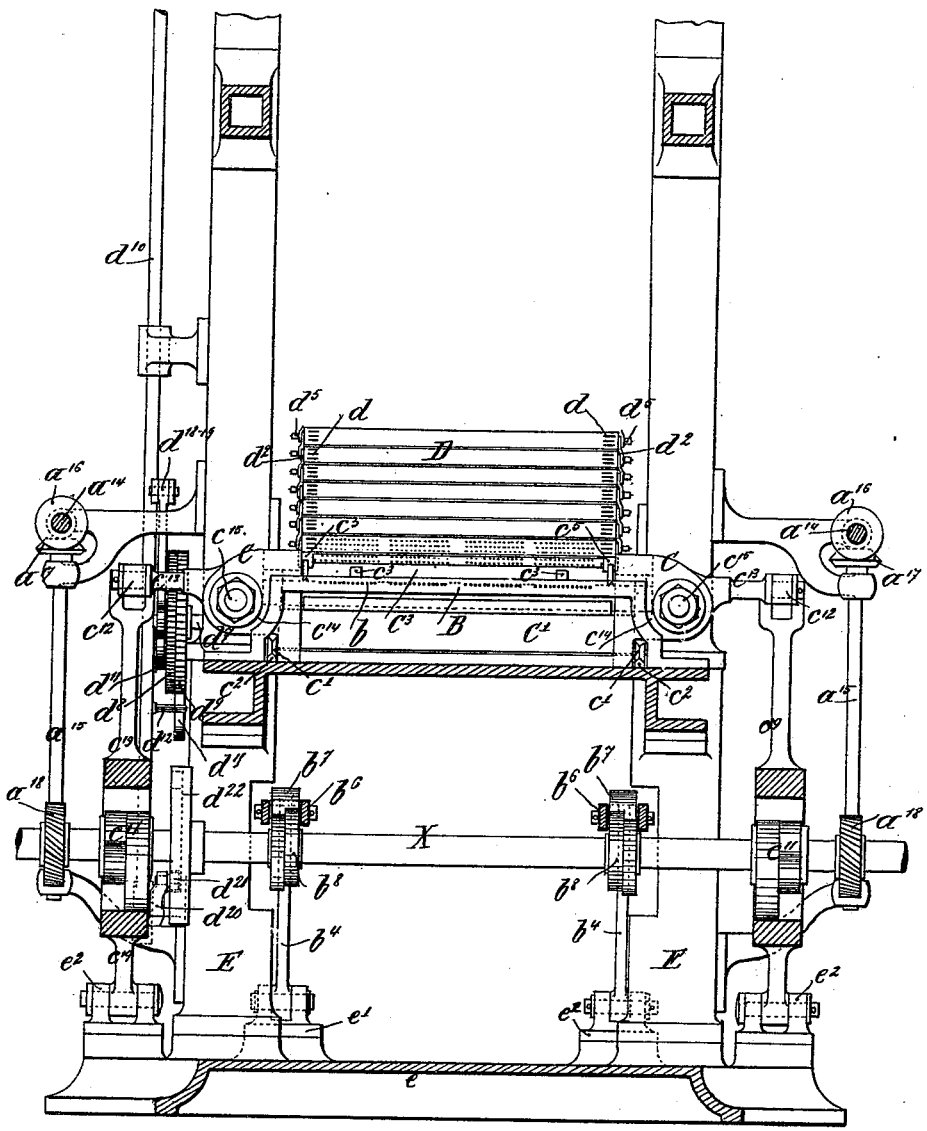

No. 643,010. Patented Feb. 6, 1900.
H. SÉVÈNE & E. D. CAHEN.
MACHINE FOR MANUFACTURING AND BOXING MATCHES.
(Application filed Aug. 21, 1897.)
(No Model.) 15 Sheets—Sheet 7.
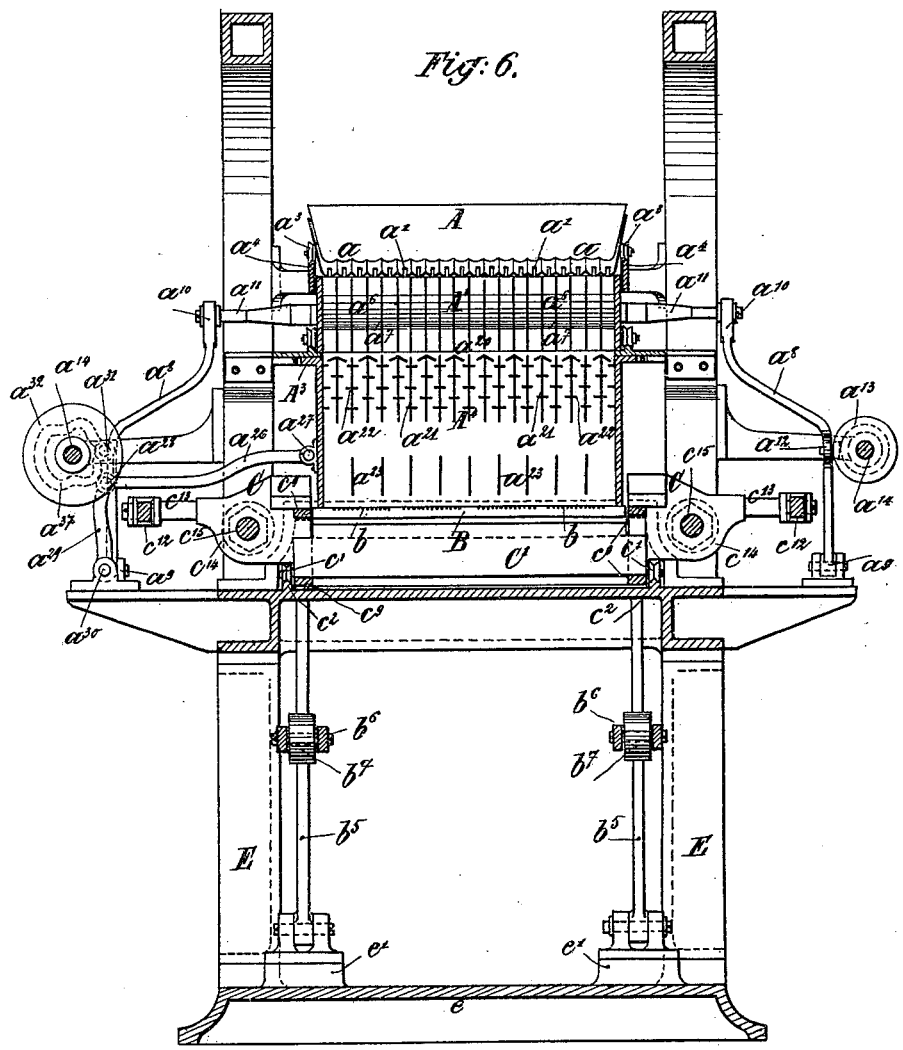
Fig: 6.
WITNESSES
INVENTORS
Henri Sévène
and
Emile D. Cahen
BY
Howson and Howson
THEIR ATTORNEYS.

No. 643,010. Patented Feb. 6, 1900.
H. SÉVÈNE & E. D. CAHEN.
MACHINE FOR MANUFACTURING AND BOXING MATCHES.
(Application filed Aug. 21, 1897.)

(No Model.) 15 Sheets—Sheet 9.

WITNESSES
INVENTORS
Henri Sévène and Emile D. Cahen
BY
Howson and Howson
THEIR ATTORNEYS No. 643,010. Patented Feb. 6, 1900.
H. SÉVÈNE & E. D. CAHEN.
MACHINE FOR MANUFACTURING AND BOXING MATCHES.
(Application filed Aug. 21, 1897.)
(No Model.) 15 Sheets—Sheet 10.
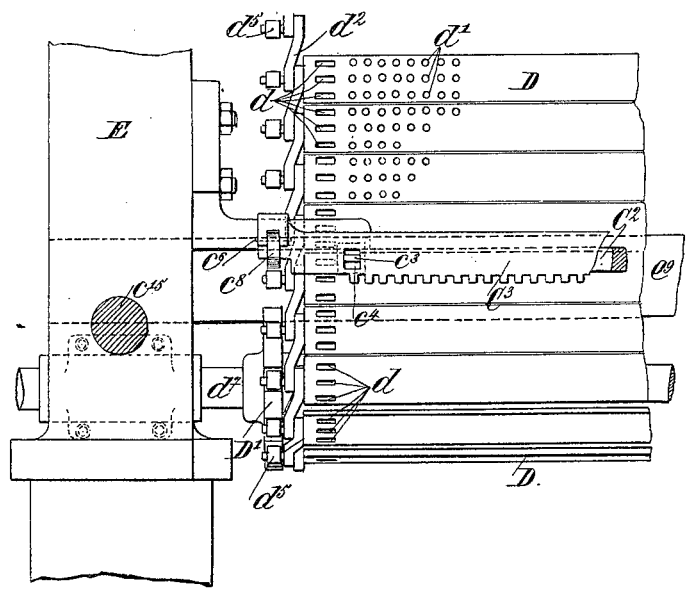
Fig.9ˣ
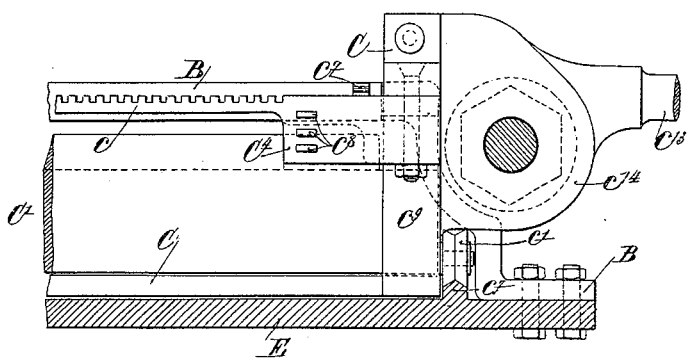
Fig.10ˣ
WITNESSES:
INVENTORS
HENRI SÉVÈNE
EMILE D. CAHEN
BY Howson and Howson
THEIR ATTORNEYS.

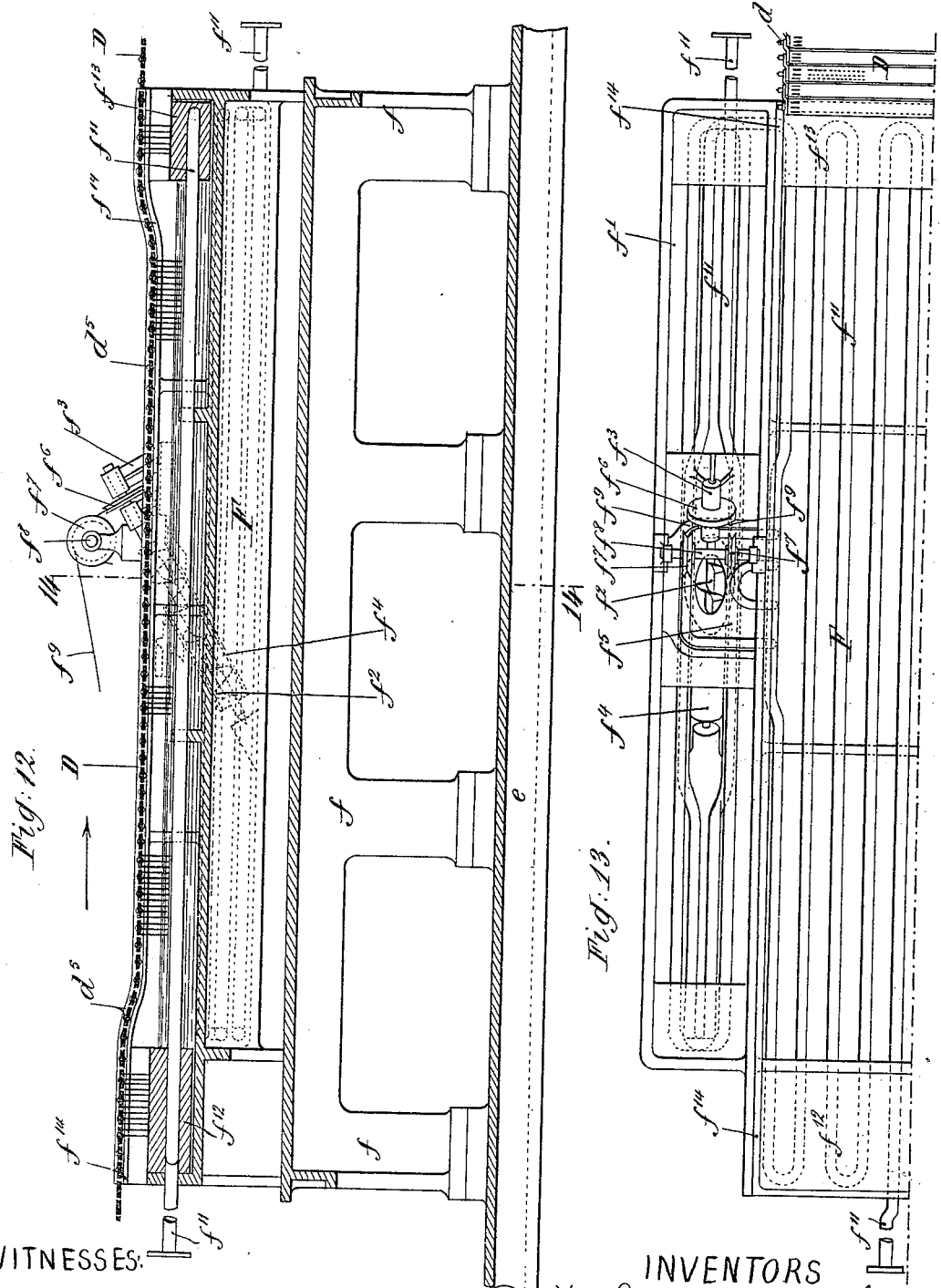

No. 643,010. Patented Feb. 6, 1900.
H. SÉVÈNE & E. D. CAHEN.
MACHINE FOR MANUFACTURING AND BOXING MATCHES.
(Application filed Aug. 21, 1897.)
(No Model.) 15 Sheets—Sheet 12.
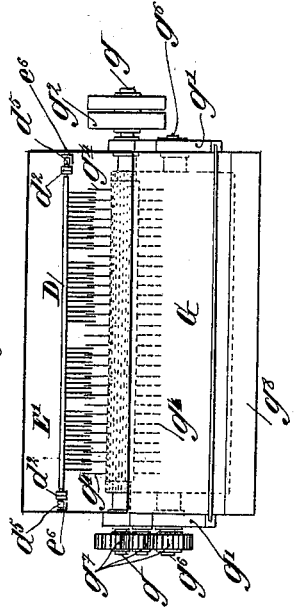
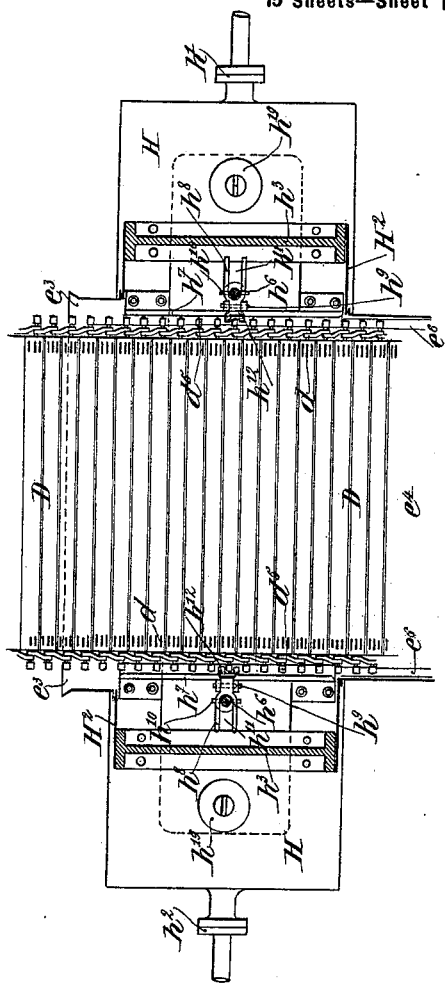
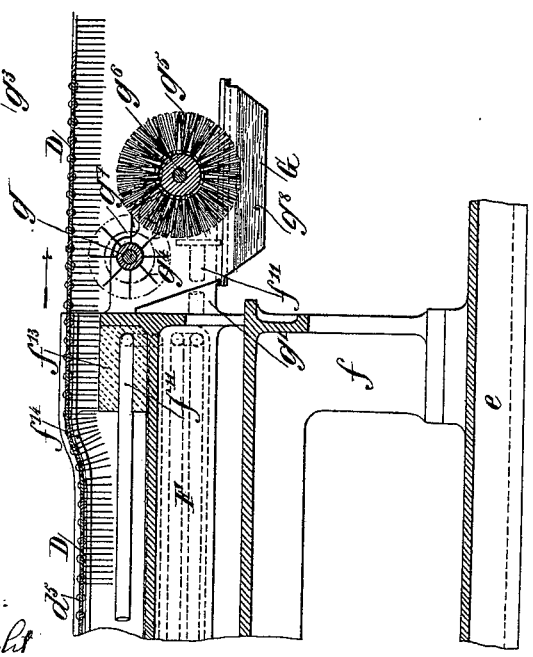
WITNESSES:
INVENTORS
HENRI SÉVÈNE
EMILE D. CAHEN
BY
THEIR ATTORNEYS.

No. 643,010. Patented Feb. 6, 1900.
H. SÉVÈNE & E. D. CAHEN.
MACHINE FOR MANUFACTURING AND BOXING MATCHES.
(Application filed Aug. 21, 1897.)
(No Model.) 15 Sheets—Sheet 13.
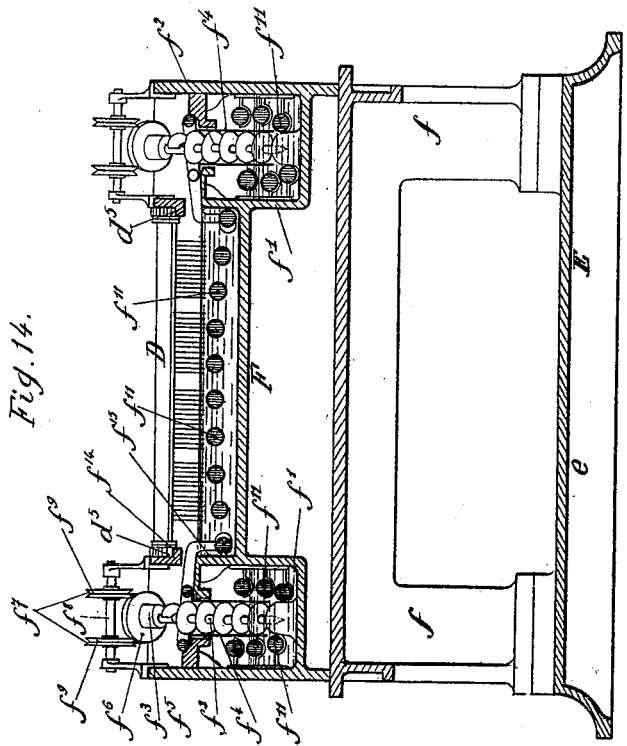
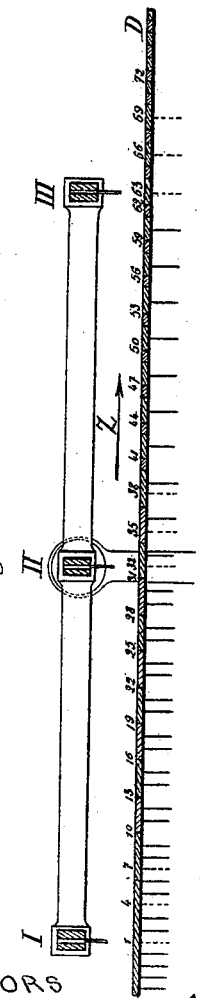
WITNESSES:
INVENTORS
Henri Sévène & Emile D. Cahen
BY
Howson & Howson
THEIR ATTORNEYS.

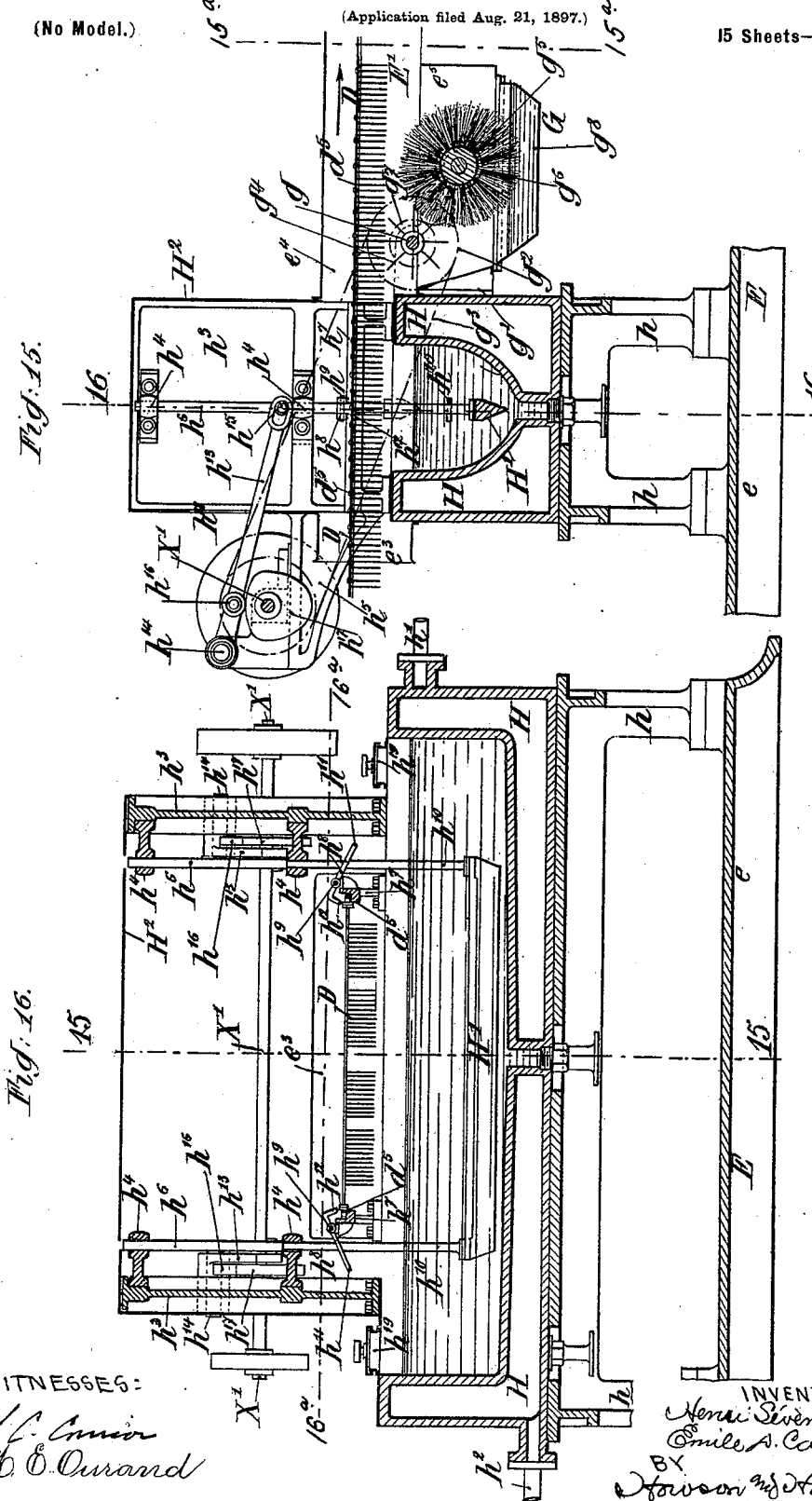

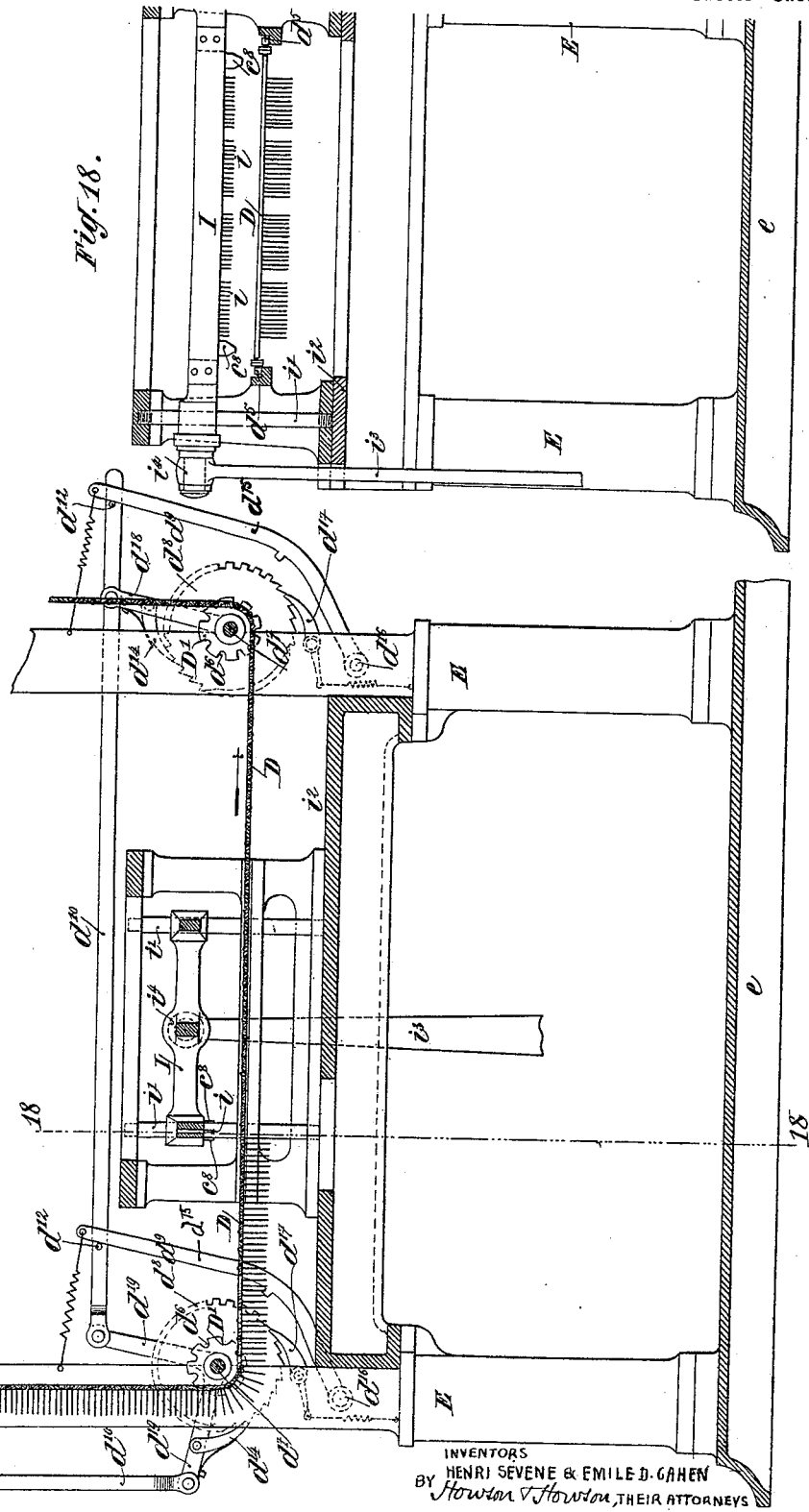

UNITED STATES PATENT OFFICE.

HENRI SÉVÈNE AND EMILE DAVID CAHEN, OF PARIS, FRANCE.

MACHINE FOR MANUFACTURING AND BOXING MATCHES.

SPECIFICATION forming part of Letters Patent No. 643,010, dated February 6, 1900.

Application filed August 21, 1897. Serial No. 649,036. (No model.)

*To all whom it may concern:*

Be it known that we, HENRI SÉVÈNE and EMILE DAVID CAHEN, citizens of the Republic of France, residing in Paris, France, have invented an Improved Machine for the Complete and Continuous Manufacture of Matches, of which the following is a specification.

This invention relates to a machine constructed with the view of solving the problem of manufacturing matches in a continuous and complete manner by machinery. The machine receives the primary materials of manufacture—viz., the match splints or stems of wood or wax and the fire-producing substances, (sulfur, paraffin, &c.,) dipping-pastes, (chemical, chlorated, &c.) All these operations are effected under the condition that the matches from the time of sulfuring or paraffining are never at any time in contact with the air of the workshop, so that no deleterious vapor can vitiate the atmosphere of the latter.

In order that no doubt may arise as to the nature of our invention and as to the manner in which it may be carried out, we shall now proceed to describe it in detail with reference to the accompanying drawings.

Figure 2:
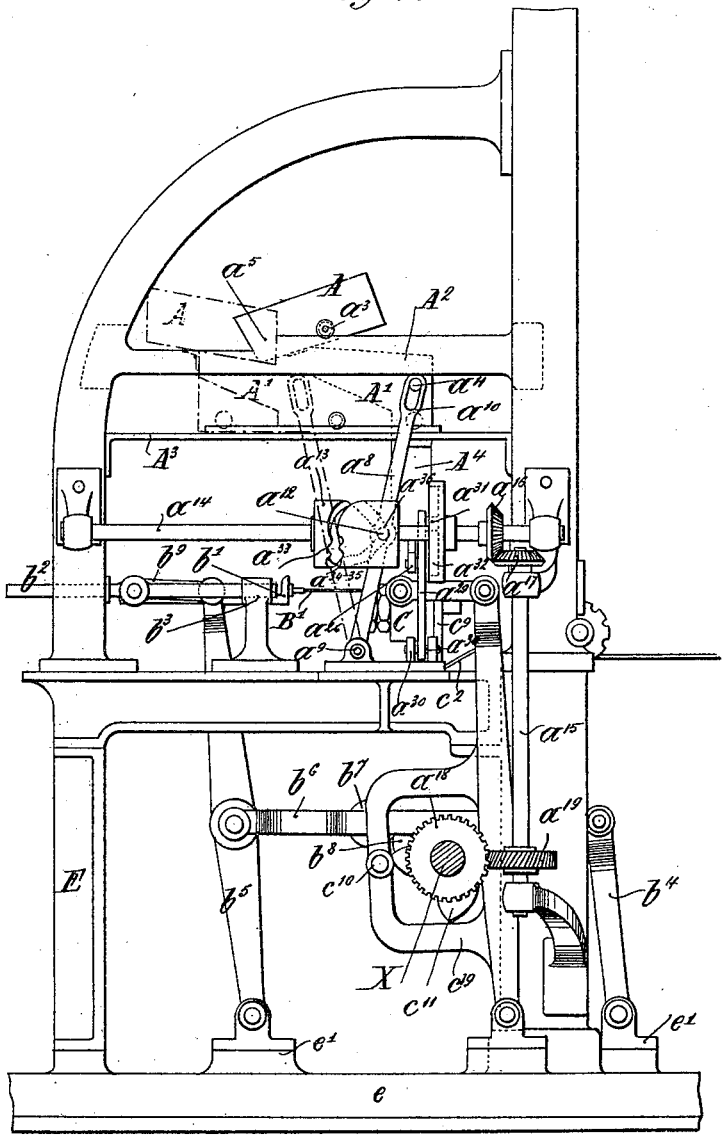
Figure 3:
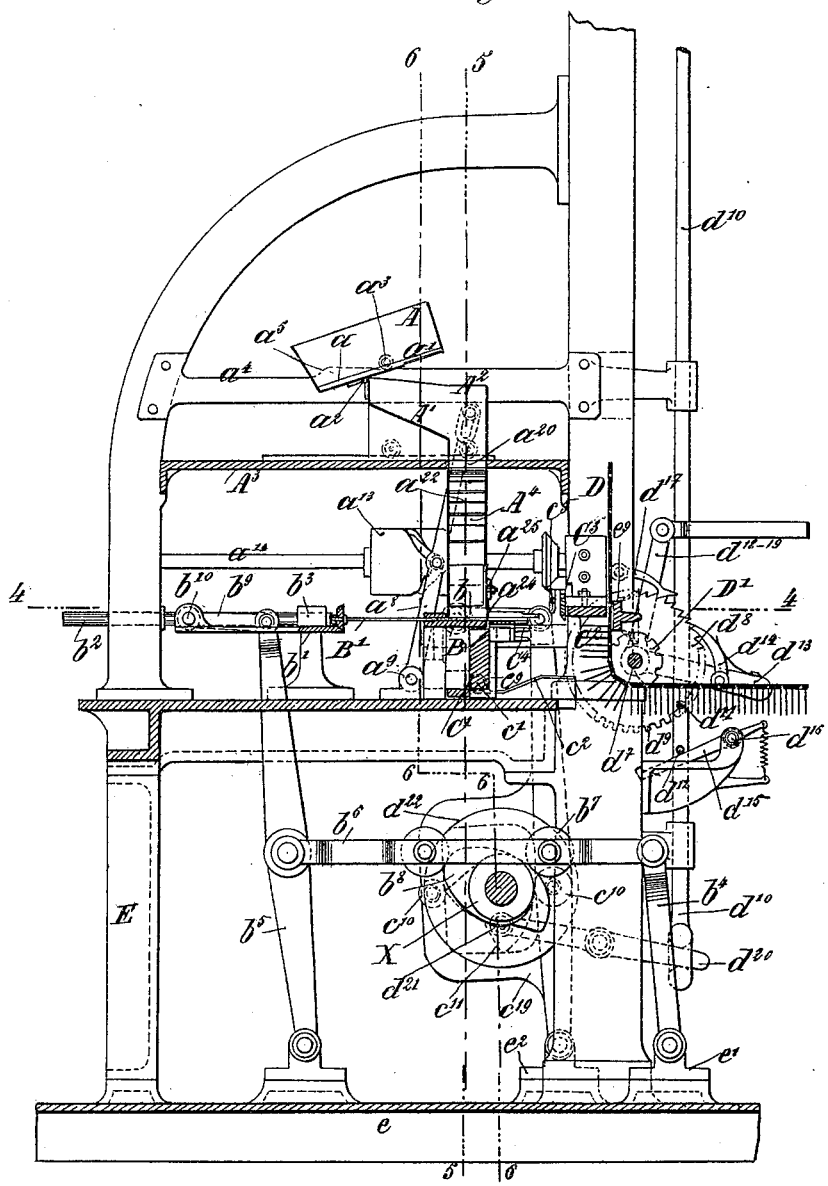
Figure 7:
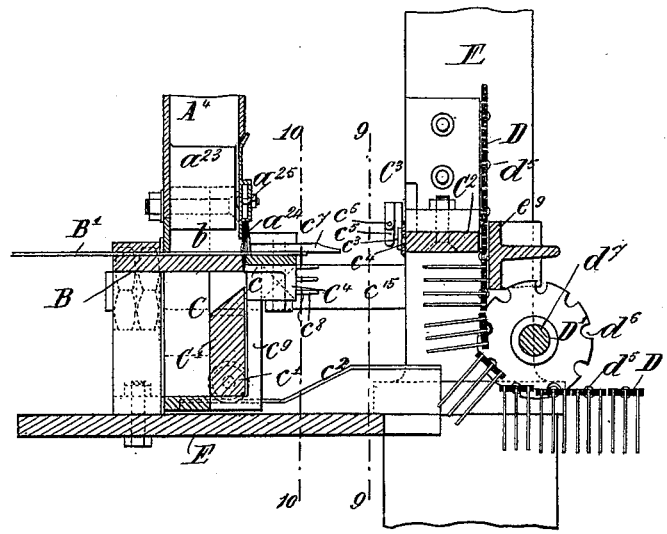
Figure 8:
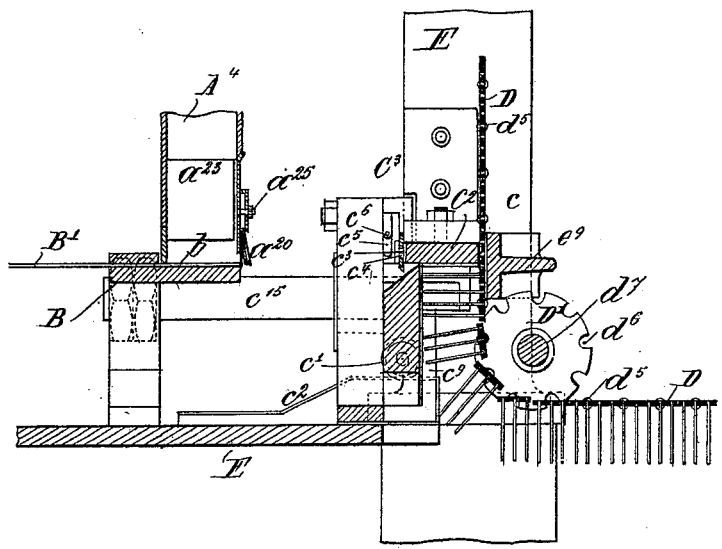
Figure 9:
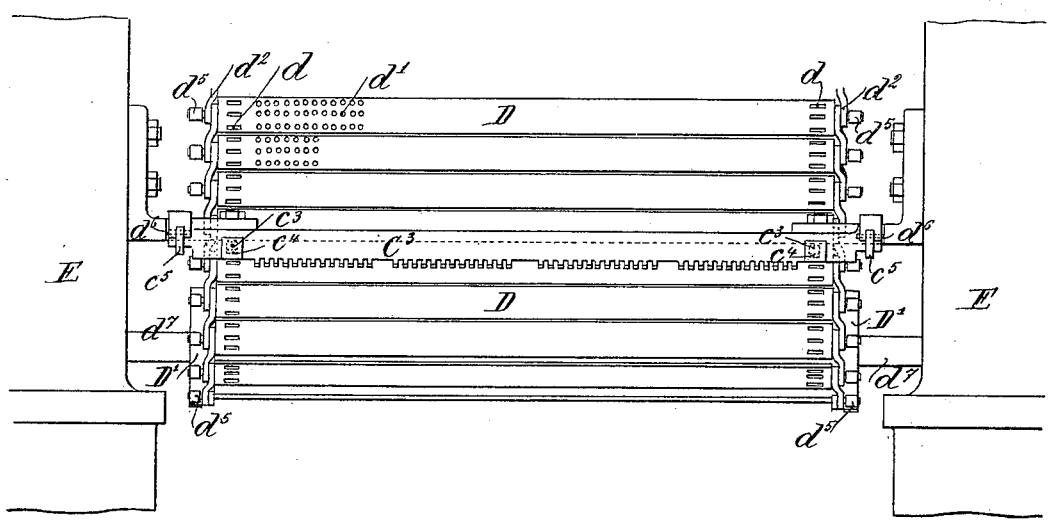
Figure 10:
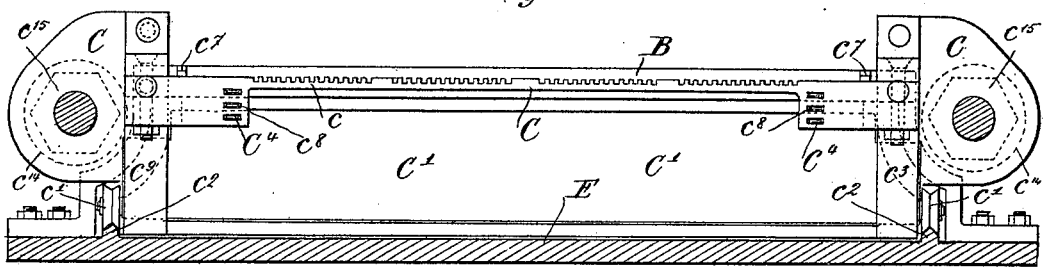
Figure 11:
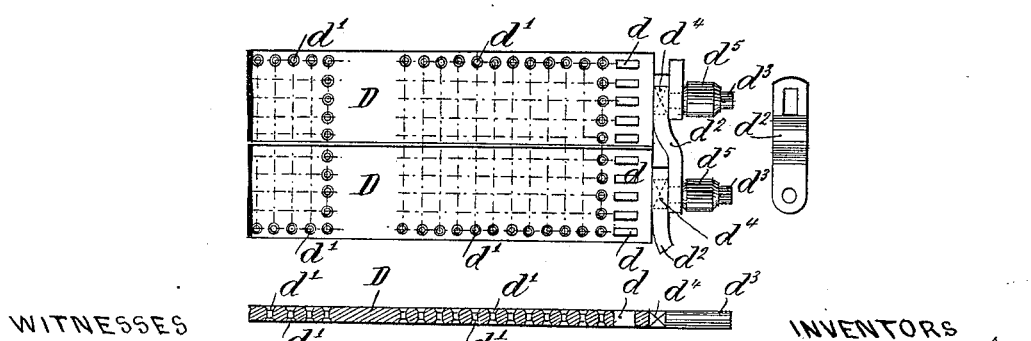

Figure 1 of the drawings is a longitudinal elevation of the entire machine, certain parts being shown in section. Fig. 2 is a side elevation of that part of the machine which is designed to receive the undipped matches, to arrange them, and to fix them in the endless carrier or chain. Fig. 3 is a vertical section according to the line 3 3 of Fig. 4, which is a horizontal section according to the line 4 4 of Fig. 3. Fig. $4^a$ shows a portion of Fig. 4 drawn to a larger scale. Fig. 5 is a vertical section according to the line 5 5, Fig. 3, the view being taken from the left-hand side of the plane of section. Fig. 6 is a vertical section according to the line 6 6 of Fig. 3, the view being taken from the right-hand side of the plane of section. Figs. 7, $7^a$, and 8 are vertical sections reproducing a portion of Fig. 3 on larger scales, showing the carriage for conveying the match-splints to the endless carrier in three different positions, Figs. 7 and 8 showing it at the two ends of its travel and Fig. $7^a$ at the center of its travel. Fig. 9 is a vertical section drawn to the same scale and according to the line 9 9 of Fig. 7, the view being taken from the left-hand side of the plane of section. Fig. $9^a$ reproduces, on a larger scale, a portion of Fig. 9. Fig. 10 is a vertical section drawn to the same scale and according to the line 10 10 of Fig. 7, the view being taken from the right-hand side of the plane of section. Fig. $10^a$ reproduces, on a larger scale, a portion of Fig. 10. Fig. 11 shows in front elevation, side elevation, and plan, to a still larger scale, a portion of the chain or carrier and represents the connection of the plates with their links. Fig. 12 is a vertical longitudinal section along the axis of that part of the machine which is designed to effect the burning and the sulfuring or paraffining of the matches. Fig. $12^a$ represents the right-hand end of Fig. 12, on a larger scale, and shows the cleanser attached to the end of this part of the machine. Fig. 13 is a half-plan of the same. Fig. 14 is a cross-section according to the line 14 14 of Fig. 12. Fig. 15 is a vertical section, according to the line 15 15 of Fig. 16, of that part of the machine which corresponds to the dipping of the matches. Fig. $15^a$ is a vertical section on line $15^a$ $15^a$ of Fig. 15. Fig. 16 is a vertical section according to the line 16 16 of Fig. 15. Fig. $16^a$ is a horizontal section taken on line $16^a$ $16^a$ of Fig. 16. Fig. 17 is a vertical section of the part of the machine where the manufactured matches are discharged from the endless carrier. Fig. 18 is a section taken on line 18 18 of Fig. 17. Fig. 19 is a diagrammatic view showing the operation of the "intercalary" clearer.

The machine comprises, in the first place, a distributer in which the undipped matches are thrown haphazard and which has for its object to arrange them in the grooves of a lower table, whence a set of needles expels them into tubes of any suitable shape provided in a transporting-carriage that brings them in front of the holes of an endless carrier, into which they are put by pressure. This distributer, Figs. 1, 2, 3, and 6, consists of four principal parts, one of which is a receptacle A of hopper shape, closed at its lower part by a bottom formed of a series of semicylindrical channels $a$, which are arranged side by side and in the forward parts of which there are formed apertures $a'$, intended to allow the matches to fall into passages A'. This receptacle A is hinged at $a^2$ to the rear edge of the passages hereinafter referred to. It is fitted with two rollers $a^3$, which run on rails $a^4$, which are carried by the general framing of the machine and are formed with a bend at $a^5$. The passages A' are formed by partitions dividing the compartment into a series of cells $a^6$, having inclined bottoms, each cell being situated under a corresponding channel $a$ of the case. These passages are supported at the rear part of the arranger $A^2$, hereinafter referred to. The arranger $A^2$ has the shape of a rectangular box subdivided by thin partitions $a^7$ into a series of bottomless compartments which correspond to the cells $a^6$ of the passages. The arranger is supported by a table $A^3$, connected to the general framing on which it slides. This sliding motion parallel to the general axis of the machine is effected by means of a lever $a^8$, having its fulcrum at $a^9$ on the framing and its free end $a^{10}$ connected to a knob $a^{11}$, carried by the arranger $A^2$. This lever is provided with a roller $a^{12}$, rolling in the groove of a cam $a^{13}$, which is mounted on a shaft $a^{14}$, receiving its motion from the main driving-shaft X through the medium of an auxiliary shaft $a^{15}$, connected at one end to the shaft $a^{14}$ through bevel-wheels $a^{16}$ and $a^{17}$ and at the other end to the main shaft by means of helicoidal toothed wheels $a^{18}$ and $a^{19}$. The fourth main part of the distributer is a magazine $A^4$, which is situated under the table $A^3$ opposite an aperture $a^{20}$, formed in the latter. It is supported by a grooved table B, hereinafter referred to, in such a manner as to be capable of sliding on the said table. This magazine has the shape of a rectangular box (see Figs. 3 and 6) provided for a portion of its height with a series of vertical partitions $a^{21}$, intersected by horizontal baffles $a^{22}$. These vertical partitions extend from the top of the magazine and terminate about half-way from the bottom thereof. Other partitions $a^{23}$, preferably placed farther apart than the first ones, are arranged near the bottom of the magazine in such a manner as to leave between them and the upper partitions an entirely free space of some centimeters and another free space of about two centimeters between their bases and the bottom of the magazine. The magazine is provided at its base and on its front with a brush $a^{24}$, fixed by screws $a^{25}$. The magazine has imparted to it a horizontal trembling motion perpendicular to the principal axis of the machine by means of a connecting-rod $a^{26}$, jointed at one end to a knob $a^{27}$, fixed on the side of the magazine, and at the other end to a knob $a^{28}$, forming part of a lever $a^{29}$, whose fulcrum $a^{30}$ is carried by the general framing and whose free end is provided with a roller $a^{31}$, which slides in the groove of a cam $a^{32}$, keyed on the shaft $a^{14}$, driven from the main shaft X, as hereinbefore described. The operation of this distributer is as follows, (see Figs. 2, 3, 5, and 6:) The matches are thrown into the receptacle A, which in its first position (shown in dotted lines in Fig. 2) has its forward part lowered onto the passages A'. In this position it receives a series of jolts from the cam $a^{13}$, which has for this purpose a portion of its groove corrugated at $a^{33}$. These jolts have for their object to cause a certain number of matches to move down in each of the passages A' through the slits $a'$. A slightly-greater corrugation $a^{34}$ of the cam-groove causes the entirety A A' $A^2$ to move forward several centimeters in such a manner that the rollers $a^3$ of the receptacle mount the bend $a^5$ of the rails and cause the receptacle to tip backward, with the objects of gathering the matches together in the rear portion thereof and arresting their fall into the passages. A new series of jolts produced by a series of other short corrugations $a^{35}$ of the cam $a^{13}$ acts upon the matches that are in the passages and has for its object to cause them to fall and be arranged in the arranger. A last corrugation $a^{36}$ of the cam, which is greater than the others, pushes the arranger and the matches that it contains over the magazine $A^4$, which at that moment is stopped by means of a rest or circular part $a^{37}$, formed in the cam $a^{32}$, which produces the movements of the magazine. The receptacle, the passages, and the arranger return to their initial position, and this operation is repeated indefinitely.

The rocking movement of the receptacle A has for its object to stop the delivery of matches during their arrangement in the arranger $A^2$ and to prevent this arrangement from being interfered with by the continual fall of fresh matches. The magazine which has received the matches receives in its turn a shaking movement in the direction indicated.

For the proper working of the machine it is advisable first of all to fill the magazine up to the level of the lower part of the baffles $a^{22}$. When this filling has been once done, the shaking imparted to the magazine causes the machine to move down between the partitions $a^{21}$ and the baffles $a^{22}$, so as to keep up the supply of undipped matches, which tends to become exhausted through the delivery of the machine. All that is necessary, therefore, is to keep the level of the matches between the first and the last baffle $a^{22}$. To effect this result, the orifices $a'$ of the channels of the case A must be made such that the delivery is copious enough to suffice for feeding the machine and small enough not to choke the baffles $a^{22}$ of the magazine. The magazine hereinbefore described is placed on and slides along a table B, (see Figs. 3, 4, 7, 8, and 10,) in which are formed grooves $b$, the axes of which coincide with those of the holes in the endless apron or press at the moment of stoppage of the latter. This grooved table is carried by the general framing. At the rear of this table there is arranged a set of needles B', carried by a cross-beam or needle-carrier $b'$, which is provided on each side with a guiding-rod $b^2$, sliding in slideways $b^3$ in the general framing. As, on the other hand, the ends of the needles $B'$ never leave the grooves of the table B, the result is that this entirety $B'$ $b'$ is suitably guided. This set of needles has a horizontal alternating motion, as will be hereinafter described. In the forward movement of the needles their ends drive out the matches that have fallen into the grooves $b$ of the table and convey them into the corresponding grooves of the transporting-carriage hereinafter described. This transporting-carriage (see Figs. 3, 4, $4^a$, 5, 7, $7^a$, 8, and 10) consists of a grooved plate $c$, projected on brackets from and forming part of a frame C, provided with ears $c^{14}$, Figs. $4^a$, 10, and $10^a$, through each of which there extends a guide-rod $c^{15}$, connected to the general framing E. This carriage has a horizontal to-and-fro motion, as hereinafter described, partly beneath the table B, the plate $c$ being on a level with the table B, so that when the carriage is in the position shown in Fig. 7 the grooves in plate $c$ form a continuation of the grooves in table B. At the rear of plate $c$ is arranged a bar $C'$, terminating in two rollers $c'$ $c'$, which in the to-and-fro movement of the carriage run on a fixed ramp $c^2$, carried by the general framing. The slope of this ramp is made such as to cause the said bar to move up and down during the to-and-fro motion of the carriage. It is guided by two angle-pieces $c^9$, which are fixed at the rear of the carriage, and thus form a vertical slideway for the said bar. In front of the carriage C and quite close up against the endless carrier is arranged a fixed cross-bar $C^2$, (see Figs. $4^a$, 7, $7^a$, 8, and 9,) carried by the general framing and having its lower face flush with the upper face of the grooved plate $c$ of the transporting-carriage. At the rear of this cross-bar $C^2$ there is arranged a comb $C^3$, whose teeth correspond in position to the grooves in the plate $c$. This comb is carried at the rear of the cross-bar $C^2$ in such a manner that it may receive an alternating motion in a vertical plane—that is, the cross-bar is provided with pins or projections $c^3$, which slide in elongated openings $c^4$, formed in the comb. To raise and lower the comb in the desired way, a small latch $c^5$ at each end of the comb is so pivoted thereto at $c^6$ that when acted upon from the left, Figs. $7^a$ and $4^a$, the latch bears against the comb-support and so forms a rigid connection with the comb. It may then be raised by riding on the incline of a ramp $c^7$, fixed to the carriage, when said ramp is moved in the direction of the arrow in full lines, Fig. $7^a$; but the pivot $c^6$ allows the latch $c^5$ to yield when acted upon from the right. The transporting-carriage is further provided at each of its edges with a series of teeth $c^8$, carried on supports $C^4$, Figs. 7, 8, and 10, which supports are formed in one with the grooved plate $c$, the vertical distance separating these teeth $c^8$ being equal to the distance between two consecutive rows of holes in the endless carrier D. The carrier itself has at its edges series of holes $d$ of a section equal to that of the teeth $c^8$ and arranged exactly in front of each row of matches. The endless carrier D is supported, at the moment of forcing the matches, by a cross-piece $e^9$ of the general framing, situated opposite the row of grooves of the plate $c$ of the carriage C. The operation of this portion of the machine is as follows: Each groove of the table B is charged with a match as a result of the movement of the magazine $A^4$. At the moment when the carriage C reaches its extreme rear position, Fig. 7, near the table B the needles $B'$ push the matches into the grooves of the grooved plate $c$ of the said carriage. Then the needles are moved back, so as to free the grooves $b$ and to make room for a fresh series of matches coming from the magazine. At the same time the carriage C moves forward toward the endless carrier D, (see Fig. $7^a$,) moving with it the bar $C'$, whose end rollers $c'$ roll on the ramps $c^2$. Before the carriage charged with matches passes under the cross-bar $C^2$ the inclined position of the ramps $c^7$ of the said carriage, acting upon the latches $c^5$ of the comb $C^3$ in the direction of the arrow in full lines in Fig. $7^a$, causes the latch to become rigid with the comb, and the latch riding up the incline raises the comb in such a manner as to give free passage to the matches contained in the grooves of the carriage. The carriage then moves forward under the cross-bar $C^2$, and when it is completely engaged the rear bar $C'$ is raised by the ramp $c^2$. (See Fig. 8.) Each match is thus completely imprisoned in a tube which is open only at its forward part and is formed by a groove of the grooved plate $c$ of the carriage C, the cross-bar $C^2$, and the rear bar $C'$. The carriage continues its advance, and the teeth $c^8$ of the support $C^4$ engage in the holes $d$ of the endless carrier D and insure the fixing of the endless carrier at the exact place it ought to occupy for charging—that is to say, at that moment a row of countersunk holes $d'$ of the carrier D is stopped just opposite the grooves of the plate of the carriage. The carriage C, continuing its forward movement, pushes the row of matches into the corresponding countersunk holes $d'$ of the carrier D. In consequence of the special arrangement just described, by means of which each match is completely imprisoned in a tube formed by the groove of plate $c$ and the cross-bar $C^2$, it is capable of resisting the rather considerable pressure exerted by the rear bar $C'$ that is necessary for fixing the match firmly in the endless carrier. At this moment the rear end of the ramp $c^7$ of the carriage having moved beyond the nose of the latch $c^5$ the latter falls behind the said ramp and moves with it in its fall the comb $C^3$ in such a manner as to return the lower ends of the teeth of the comb to the level of the bottom of the grooves in plate $c$ of the carriage C. The carriage then returns to the rear, leaving the matches fixed in the endless carrier D. The rear bar C' moves down again and uncovers the rear end of the grooves. The carriage continuing its return movement the teeth of the comb engage in the said grooves and clean them completely. The comb has, in fact, remained lowered in consequence of the hinge $c^6$ of the latch $c^5$, which allows the latch to assume an inclination toward the rear and become of no effect in the return movement of the ramp $c^7$, whereas in the forward movement of the said ramp the latch bears against the rear of the cross-bar, and thus forms a rigid connection, which compels the comb to rise under the action of the inclined portion of the ram. The carriage continues its rearward movement until it is close to the fixed grooved table B, and the series of movements is repeated indefinitely.

The movements of the needle-carrier and of the transporting-carriage may be effected in any suitable manner—for instance, as follows, Figs. 2, 3, and 4: Upon the base-plate $e$ of the general framing E there are fixed four caps or blocks $e'$, serving as fulcra to two jointed parallelograms composed of levers $b^4$ $b^5$ and cross-pieces $b^6$, each carrying two rollers $b^7$. These rollers are operated by a double cam $b^8$, keyed on the main shaft X of the machine, which imparts to the said parallelogram a to-and-fro motion, which is transmitted by the free ends of the levers $b^5$ and connections $b^9$ to the knobs $b^{10}$ of the needle-carrier $b'$. The base-plate $e$ carries two other caps or blocks $e^2$, which serve as points of attachment for levers $c^{19}$, each of which carries two rollers $c^{10}$, rolling on the peripheries of double cams $c^{11}$, keyed on the main shaft X of the machine. The free ends of these levers $c^{19}$ drive, through the medium of connections $c^{12}$, knobs $c^{13}$, carried by the lugs $c^{14}$ of the carriage C for conveying into the endless carrier.

The endless carrier, Figs. 4ª, 7, 7ª, 8, 9, and 11, hereinbefore referred to, consists of a continuous succession of metal plates D, perforated with several rows of holes $d'$, countersunk at both ends, each line of holes corresponding to the row of matches brought by the transporting-carriage. At each end of the plate and in front of each row of small countersunk holes $d'$ there is formed a hole $d$ of larger size and of oval or other suitable shape corresponding to the teeth $c^8$ of the support $C^4$ of the carriage C. The rows of holes $d'$ are equidistant from one another in each plate D, and the distance that separates the last row of one plate from the first row of the following plate is equal to the distance between two consecutive rows in a plate. The plates D are connected together in the form of an endless apron or continuous carrier by means of links $d^2$, which stay together two adjacent plates. (See Fig. 11.) For this purpose the ends of each plate are terminated by trunnions $d^3$, the shoulder $d^4$ of which has an elongated, flattened, oval, or generally non-circular section, the body $d^3$ of the same being cylindrical. Each link $d^2$ is doubly bent and has two holes (one being flattened or elongated and the other being circular) corresponding, respectively, to the shoulder and the body of the journal. Rollers $d^5$, mounted on the ends of the journals, facilitate the running of the carrier on the rails and the guide-wheels D'. The elongated or flattened part $d^4$, formed on the shoulders of the journals, has for its object to prevent the relative shifting of the plates with reference to the links, the latter having a perfectly-defined position whatever may be the position of the chain. The central plane of each link coincides with that of the axes of two successive plates, so that the plates cannot accidentally turn separately and cause sticking of the matches of two adjacent plates.

At each change of direction of the endless carrier it passes around guide-wheels or drums D', provided with notches or sockets $d^6$, corresponding to the rollers $d^5$ of the carrier. These wheels are mounted in pairs upon shafts $d^7$, which are carried in any suitable manner by the general framing.

At each revolution of the main shaft X, immediately after the introduction of a row of matches, the endless carrier advances to an extent equal to the distance between two successive rows of holes. The regularity of this intermittent forward movement is insured in the following manner, (see Figs. 1 and 3:) At one end of each of the shafts $d^7$ are keyed two ratchet-wheels $d^8$ $d^9$, the one $d^8$ with a running-detent—i. e., with ordinary teeth—and the other with a rest-detent—i. e., with double-flank teeth. The rods $d^{10}$, which have an oscillating movement, carry two spurs $d^{11}$ $d^{12}$. The first, $d^{11}$, operates a lever $d^{13}$, mounted loosely on the shaft $d^7$ and carrying a driving-pawl $d^{14}$, acting on the ratchet-wheel $d^8$ with running-detent. The second spur $d^{12}$ operates a second lever $d^{15}$, which has a pivot $d^{16}$, supported by the framework, and whose nose becomes engaged at the desired moment in the spaces between the teeth of the second ratchet-wheel $d^9$. A stop-pawl $d^{17}$, pivoted to the framework, keeps the ratchet-wheel $d$ in its position of rest. This collection of parts is repeated at each change of direction of the carrier. The rods $d^{10}$ are connected together by means of simple levers $d^{18}$ or bell-crank levers $d^{19}$, according to circumstances and in such a manner that they will all move quite rigidly together. It is therefore sufficient to operate a single one placed in proximity to the main shaft X. For this purpose the rod $d^{10}$ is jointed to the free end of a lever $d^{20}$, which is fixed to the base-plate $e$, and whose other end carries a roller $d^{21}$, that travels in the groove of a cam $d^{22}$, keyed on the main shaft X. The operation of this arrangement is as follows: When a row of matches has been put into the endless carrier and the rods $d^{10}$ are commencing their forward movement, the spurs $d^{11}$ push the levers $d^{13}$ and communicate to the chain, through the pawls $d^{14}$ and the ratchet-wheels $d^8$, a general movement equal to the distance between two rows of matches. The movement of the spur $d^{12}$ permits the lever $d^{15}$ to advance into contact with the periphery of the teeth of the wheel $d^9$, and at the precise moment when the driving-pawl $d^{14}$ has terminated its stroke the nose of the lever $d^{15}$ is opposite a space of the wheel $d^9$ and engages therein under the influence of its spring. The chain is then stopped suddenly and cannot pass its stopping-point whatever be the inertia of the part in motion. At the same time the stopping-pawl $d^{17}$ passes into a tooth-space of the ratchet-wheel $d^8$. In the return movement of the rods $k^{10}$ the spur $d^{11}$ in receding allows the driving-pawls $d$ to return. Then the spur $d^{12}$ bears in its turn upon the lever $d^{15}$, so as to disengage its nose from the wheel $d^9$, and then the entirety of the wheels $d^8$ $d^9$ is held merely by the stopping-pawl $d^{17}$. The series of movements is reproduced in this manner indefinitely. After the match splints or stems have been put into the endless carrier the chain carrying them becomes horizontal and passes over the burning, sulfuring or paraffining, and steeping vat, (Figs. 12, 13, and 14.)

The burning and sulfuring table forms an entirety, constituted by a metallic vat F, which is flat and supported by an auxiliary frame $f$ on a base-plate $e$ of the general framework. This vat is furnished on its sides with reservoirs or pockets $f'$, in each of which works an Archimedean screw $f^2$, carried by a small support $f^3$ and rotating within a sheath $f^4$, at the upper end of which is arranged a weir $f^5$, whose level is slightly higher than that of the edge of the general vat. A set of pulleys $f^6$ $f^7$, of which one, $f^6$, is fixed on the axle of the Archimedean screw and the other two are on an auxiliary axis $f^8$, serves for turning the screw by means of a cord $f^9$, which also passes around a pulley $f^{10}$, keyed on the main shaft X. In the vat and the lateral reservoirs $f'$ are arranged a series of almost juxtaposed steam-pipes $f^{11}$, whose joints are all at the two ends of the vat. All these joints are embedded in metallic masses $f^{12}$ $f^{13}$, which are cast at each end and which protect them against the corrosive action of the molten sulfur. One of these metallic masses $f^{12}$ constitutes the burning-table, and the sulfur-bath is situated between the vertical sides of the two metallic masses $f^{12}$ $f^{13}$, which form its end walls, the side walls being formed by the partitions that separate the "vat," properly so-called, from the reservoirs. Rails $f^{14}$ are arranged at the sides of the vat to form a way for the endless carrier. Their profile exhibits, first of all, a horizontal part corresponding to the metallic mass $f^{12}$, that forms a burning-table, they being placed at a height such that the matches are flush with the upper part of this metallic mass. Then the rail is deflected toward the base at the commencement of the sulfur-bath. Afterward their profile exhibits a horizontal part and then rises at the exit of the sulfur-bath over the metallic mass $f^{13}$. The object of this arrangement is to secure a constant level in the vat in the following manner: The upper edge of the partitions $f^{15}$, forming a weir, insures the fixity of the level of the sulfur or of the paraffin in the vat. The distance between this edge and the rail $f^{14}$ has been determined in such a manner as to limit the sulfuring or paraffining to a suitable height on the head of the matches. The Archimedean screw, drawing the melted sulfur from the lateral reservoirs, constantly spreads it over the weirs $f^5$, whence it escapes into the "vat" F, properly so called. The quantity of sulfur or of paraffin thus introduced is slightly greater than that which is carried away by the matches. The excess returning over the edges of the partitions $f^{15}$ into the lateral reservoirs or pockets $f'$ the desired permanent arrangement for the automatic feeding with constant level is thus established.

With the sulfuring is combined a cleaner G, (see Figs. 1 and $12^a$,) situated in front of the sulfuring-vat F and intended to remove any matches that may accidentally become stuck on the heads of the matches that are properly fixed in the carrier. This device comprises a shaft $g$, which is mounted in two supports $g'$, attached to the framing in any suitable manner, and carries at one end a pulley $g^2$, connected, by means of a belt $g^3$, with a shaft $X'$ for driving the dipping mechanism. Needles $g^4$ are fixed radially to the said shaft and are arranged in the middle of the intervals between the longitudinal lines of the matches in such a manner as not to meet any good matches during their rotation and to eliminate all badly-arranged matches. A circular brush $g^5$, mounted on an axle $g^6$, journaled in the same supports $g'$ and connected to the axle $g$ by means of a train of toothed wheels $g^7$, rotates in the opposite direction and effects the elimination of the bad matches by causing them to fall into a vessel $g^8$, containing water or other liquid. After having passed over the cleaner the carrier passes to the dipping mechanism, (see Figs. 1, 15, 16, and $16^a$,) which comprises a trough H, having a double bottom and mounted on the base-plate $e$ of the general framing E by means of any suitable support $h$. Upon the outer wall of the double bottom are mounted pipe-unions $h'$ and $h^2$ for the entry and exit of hot water, respectively. This trough H is provided laterally with two cast-iron cheeks $h^3$, which are fitted internally with two guiding-sockets or slideways $h^4$ and on one side with a bracket $h^5$, intended to carry the parts for driving the dipping-plate, as hereinafter described. In these guide-sockets there slide two rods $h^6$, carrying at their base a plate H', of prism shape, the upper face of which is flat and horizontal, while its lower part is wedge-shaped. The trough is also provided with two supports $h^7$, forming guide-rails for the endless chain D and each carrying a rocking lever $h^8$, pivoted at $h^9$. The ends of each lever $h^8$ are both in the form of forks, the outer end $h^{11}$ embracing the guide-rods $h^6$, which carry a corresponding projection $h^{10}$, the inner end $h^{12}$ being adapted to embrace the rollers $d^5$ of the plates of the press at the moment of dipping.

The alternating motion or intermittent raising of the plate H' may be effected in any suitable manner, as by the following means: Each bracket $h^5$ carries a lever $h^{13}$, pivoted at $h^{14}$. This lever has its free end in the form of an eye embracing a knob $h^{15}$, fixed to the corresponding guide-rod $h^6$. The lever further carries a roller $h^{16}$, running on a cam $h^{17}$, keyed on a shaft X', mounted on the brackets $h^5$ and connected to an auxiliary shaft Y' by means of a pair of wheels and a pitch-chain $x'$. (See Fig. 1.) This auxiliary shaft Y' is situated under the base-plate $e$ and is connected to a driving-shaft corresponding to the main shaft X by means of a pair of wheels and a pitch-chain $y'$. This driving-shaft Y is itself connected to the main shaft X by means of a pair of toothed wheels and a pitch-chain $x$.

A sheet-metal casing $H^2$, fixed to the cheeks $h^3$ and to the trough H, closes the upper part of the apparatus on all sides and shuts it off from the atmosphere in the workroom. It has only an aperture $e^3$ at the rear upon which is fitted the inlet-passage E' for the matches, an aperture $e^4$ in front for the exit of the matches, and two small side apertures $h^{18}$ for the passage of the operating-levers $h^{13}$.

The operation of the apparatus is as follows: The endless carrier in its general movement passes over the rails $h^7$, above the dipping-trough H, which is filled with chlorated or other chemical paste through apertures $h^{19}$, which are closed by air-tight plugs. At the moment of the stoppage of the press the cams $h^{17}$ raise the levers $h^{13}$, which move with them the rods $h$, and therefore also the plates H', the upper surface of which has retained a uniform and sufficient layer of paste. When the plate is about to complete its ascent, the projections $h^{10}$, acting on the outer ends $h^{11}$ of the levers $h^8$, depress the forks $h^{12}$, which imprison the rollers $d^{15}$ and insure the fixity of the endless carrier. At that instant the plate H' comes into contact with the ends of the matches to effect the dipping. The plate then moves down again. The projections $h^{10}$ release the levers $h^8$, which then rise again and release the press and allow the latter to receive a fresh forward impulse. This operation is repeated indefinitely. The width of the plate may be equal to that of one or more chain plates, and the relative velocity of the shafts X and X' is such that at each ascent of the plate H' the carrier is moved forward to the extent of the width of the plate. The shape of the cam may be such as to cause the plate to remain stationary for a moment at the instant of dipping. The advantage of this arrangement consists in effecting dipping with a plate by mechanical means, while avoiding the scum of the paste, and is due to the very slow motion and to the rational shape of the plate. The most favorable result is obtained when the travel of the plate H' is regulated in such a manner that its lower part remains always in engagement with the paste, so as to obviate shock at the moment of the descent of the plate. The endless carrier passes out of the dipping apparatus through the extension of the passage E', which is fitted on the exit-orifice $e^4$, and passes in front of a cleaner G, which is just like that which is combined with the sulfuring apparatus, so that the description given above is applicable in all respects to this cleaner, which is situated in a bulged part $e^5$ of the passage. (See Figs. 1 and 15.) After leaving the cleaner the endless carrier imprisoned in the passage E' first follows a horizontal path, (see Fig. 1,) in which it is guided by rails $e^6$, Fig. 15$^a$, fixed to the vertical sides of the passage E'. Then it passes over drums D', actuated by the combined arrangement of ratchet-wheels hereinbefore described after the matches have been placed in the carrier. The carrier and the passage rise vertically up to the top of the machine. The chain passes again over drums D', which lead it horizontally backward, and in this horizontal path it travels on other rails $e^6$, like those hereinbefore mentioned. When it has arrived at the back of the machine, it descends vertically, then returns horizontally forward as far as the stripping apparatus. After being stripped the endless carrier passes through a small opening $e^7$, Fig. 1, and returns to the apparatus for charging it with match splints or stems after having passed through free air over the last pulleys D'. The passage E' thus forms a closed chamber, in which the matches circulate from the dipping apparatus to the stripping apparatus, which serves as a drying-chamber and in which there is maintained a reduction of pressure produced by a fan or other apparatus for withdrawing air connected with the passage—for example, at $e^8$. This reduction of pressure produces the current of air necessary for the drying. The air enters into the chamber through the openings that have been arranged for the entry and exit of the endless carrier and the reduction of pressure, which determines the direction of the gaseous current and prevents the vitiated air from reëntering the workroom. After having circulated in the drying-chamber the carrier arrives opposite the punches of the stripping apparatus, Figs. 17 and 18. These stripping-punches $i$ are mounted in one or more of the cross-pieces of a frame I, which has an alternating vertical movement. This cross-piece is guided at its ends by rods $i'$, mounted on a table $i^2$, carried by a base-plate $e$. The alternating movement can be communicated to the frame in any suitable manner—as, for example, by two connecting-rods $i^3$, attached to lateral projections $i^4$ of the frame and terminated at their base by a strap $i^5$, Fig. 1, operated by an eccentric $i^6$, keyed on the shaft $X^2$, which receives its motion from the auxiliary shaft $Y^2$ through a pair of wheels and a pitch-chain $x^2$. This auxiliary shaft $Y^2$ is itself connected to the driving-shaft Y by another pair of wheels and a pitch-chain $y^2$.

At each end of the cross-pieces I are fixed teeth $c^8$ like the teeth $c^8$ described with reference to the apparatus for putting the match splints or stems into the endless carrier. The teeth $c^8$ in penetrating into the holes $d$ of the carrier have not only for their object to fix the carrier, but also, in virtue of their conicity, to bring it back to its exact position for stripping if there should be produced a certain play as a result of the wear of the moving parts.

When the movement of the machine is rapid, there is danger of the production of fire at the stripping part where a packing apparatus is attached, and in order to diminish or entirely do away with this danger we pack and strip the matches at different points by a method which we will call "intercalary" and reducing the speed of the packing apparatus. In general if we wish to strip at $n$ points we make the distance between two consecutive lines of punches equal to $(m\,m+1)\,d$, in which $m$ represents any coefficient whatever and $d$ the distance between two successive lines of holes of the press. Suppose, for example, that we wish to reduce to one-third the speed of the packing, and consequently pack at three places ($n=3$.) We employ three lines of punches $i$, and the shaft $X^2$ is connected to the rest of the machine in such a manner as to turn at a speed three times less than that of the shaft X. It is indispensable in order to strip the chain regularly at the places desired to separate the lines of punches by an interval equal to some multiple of three times the distance between two consecutive lines of holes of the carrier plus once this distance. Under these conditions the first line of punches causes the fall of the rows of matches 1 4 7 $3n+1$, the second line of punches the rows 2 5 8 $3n+2$, and the third line 3 6 9 $3n$, so that after the passage under the three lines of punches the press is completely stripped. Fig. 19 is a diagram illustrative of this method. The three lines of stripping-punches I II III (and the corresponding packing parts) are supposed at a certain moment to be placed opposite to the rows of matches 1, 32, and 63. (Consequently in the general formula that has been chosen $m=10$ and $n+3$.) It will be seen that according to this diagram during the movement of the carrier which has advanced to the extent of three impulses at each simultaneous lowering of the three lines of stripping-punches the line of punches I has stripped the rows 1 4 7, the line II has stripped the intercalary rows 32 35 38, and the line of punches III has stripped the last rows of matches 63 66 69 and has completely cleared the chain. In the diagram we have represented by dotted lines the matches that have been last expelled by the nearest series of punches. These dotted lines are afterward omitted in order to leave on the carrier only the matches that still provisionally remain there. The arrow Z indicates the direction of the movement of the carrier.

We claim as our invention—

1. In a machine for the continuous manufacture of matches, the combination of an endless carrier having perforations to receive the match-splints, with a grooved carriage, a cross-bar adapted to form with the grooved carriage tubes for the splints, a rear bar and means for bringing said rear bar against the rear end of the said tubes to force the splints into the said endless carrier as the carriage moves forward, substantially as described.

2. In a machine for the continuous manufacture of matches, the combination of an endless carrier, with a grooved carriage, a cross-bar adapted to form with the grooved carriage tubes for the match-splints at the end of the forward movement of said carriage, a rear bar and means for bringing said bar against the rear end of said tubes to close the ends of said tubes when the splints are to be forced into said carrier, a comb and means for moving the comb so that it will penetrate the grooves in said carriage during the return movement of the carriage, substantially as described.

3. In a machine for the continuous manufacture of matches, the combination of a shaking-magazine, a grooved table below the magazine, a grooved carriage having a to-and-fro motion, a set of needles adapted to push the splints from the grooved table into the grooves in said carriage, with an endless carrier, a fixed cross-bar in proximity thereto, a sliding comb carried at the rear of said cross-bar, the said carriage being provided with a rear bar sliding into position at the rear of the grooves, all substantially as and for the purposes described.

4. In a machine for the continuous manufacture of matches, the combination of an endless carrier comprising plates having holes to receive the match-splints and orifices at the ends of said plates, with a fixed cross-bar, a grooved carriage adapted to move under said cross-bar, the said carriage being provided with a rear bar sliding into position at the rear of the grooves and the said carriage being also provided with conical teeth adapted to enter the said orifices in the plates of the endless carrier, substantially as and for the purposes described.

5. In a machine for the manufacture of matches, a vat to contain the material for treating the match-splints, a metallic mass at each end of the said vat, in combination with steam-pipes passing through the said vat, the joints of which are embedded in the said metallic masses, substantially as and for the purposes set forth.

6. In a machine for the manufacture of matches, the combination of a vat to contain the material for treating the match-splints, a metallic mass at each end of said vat, and a series of steam-pipes passing through said vat, the joints of said pipes being embedded in said metallic masses, with an auxiliary reservoir separated from the vat by a weir, and containing an Archimedean screw, all substantially as and for the purposes described.

In testimony whereof we have signed our names to this specification in the presence of two subscribing witnesses.

HENRI SÉVÈNE.
EMILE DAVID CAHEN.

Witnesses:
CHARLES DONY,
EDWARD P. MACLEAN.